United States Patent Office 3,299,149
Patented Jan. 17, 1967

3,299,149
PROCESS FOR THE PREPARATION OF
CHLORINATED ETHERS
Francesco Minisci and Ugo Pallini, Milan, and Remo
Galli, Cremona, Italy, assignors to Montecatini Edison
S.p.A., Milan, Italy
No Drawing. Filed Feb. 28, 1962, Ser. No. 176,440
Claims priority, application Italy, Mar. 2, 1961,
3,855/61
10 Claims. (Cl. 260—614)

Our invention relates to a process for the preparation of mixtures of chlorinated ethers having the general formula RO—$C_4H_6Cl$, wherein R is an alkyl, cycloalkyl, aralkyl radical.

More particularly, our invention pertains to the preparation of mixtures of the following compounds:

(1) RO—$CH_2$—CH=CH—$CH_2Cl$ (1-alkoxy-4-chloro-2-butene)

(2) RO—$CH_2$—CH—CH=$CH_2$ (1-alkoxy-2-chloro-3-butene)
          |
          Cl The above compounds can be prepared by other methods, but with difficulty. The preparation of 1-alkoxy-2-chloro-3-butenes is particularly difficult. When 1,2-dichloro-3-butene is reacted with an alcoholate, which method gives good results for the preparation of the 1-alkoxy-4-chloro-butenes from the analogous 1,4-chloro derivatives, the corresponding 1-alkoxy-2-chloro-3-butene is not obtained, but rather 1-chloro-2-alkoxy-3-butene is obtained, because it is the Cl atom present in the 2-position, being closer to the allyl group and therefore more mobile, which enters the reaction.

The process of our invention consists essentially in reacting 1,3-butadiene with a hydroperoxide and a substance able to give chlorine ions, in the presence of ferrous or cuprous salts, according to the following reaction scheme:

$$ROOH + CH_2=CH-CH=CH_2 + MCl \xrightarrow[Fe^{++}]{Cu^+ \text{ or}}$$

$$\begin{cases} RO-CH_2-CH=CH-CH_2Cl \\ RO-CH_2-CHCl-CH=CH_2 \end{cases}$$

The crude product can be separated by decantation and successive distillation or by extraction with a solvent and then distillation of the extract.

The 1-2 and 1-4 derivatives are easily separated from the mixture because they boil at very different temperatures.

It is possible that the reaction occurs through the following phases:

R—O—OH+$Cu^+$→R—O·+OH·+$Cu^{++}$
R—O·+$CH_2$=CH—CH=$CH_2$→R
                —O—$CH_2$—CH=CH—$CH_2$·
R—O—$CH_2$—CH=CH—$CH_2$·+$Cl^-$+$Cu^{++}$
      →R—O—$CH_2$—CH=CH—$CH_2$—Cl+$Cu^+$

The process is carried out by adding, under stirring, the hydroperoxide to the mixture consisting of butadiene, a solution containing the cuprous or ferrous salt, and of hydrochloric acid or a water-soluble inorganic chloride, or by adding the solution of the cuprous or ferrous salt to the mixture of the other reactants. Water is the preferred solvent, but also a mixture of a water-soluble organic solvent (methanol, ethanol, acetone etc.) and water can be used. The temperature is kept between —20 and 0° C. The preferred ratios between the reactants are: butadiene 1 mol, hydroperoxide about 1 mol, chlorine ions at least 1 mol, cuprous or ferrous salt from 0.3 to 1 mol, preferably 0.4–0.5 mol.

The reaction takes place immediately, but it is preferable to continue the stirring for 15–30 minutes after the reactants have been admixed.

The process of our invention, in addition to simplicity of operation, has the further advantage of employing inexpensive raw materials; in fact, hydroperoxides, and particularly tertiary hydroperoxides, are obtained by oxidation of hydrocarbons with air.

The 1-alkoxy-4-chloro-2-butenes and the 1-alkoxy-2-chloro-3-butenes are useful as insecticides and as intermediates for the preparation of alpha-omega-substituted acids by reaction with alkaline cyanides or with carbon monoxide or with acetylene and carbon monoxide.

The following examples are given to illustrate, but not to limit, the present invention.

Example 1

90 g. t-butyl-hydroperoxide were slowly added to a mixture consisting of: 91 g. (0.6 mol) ferrous sulphate, 36.5 g. (1 mol) hydrochloric acid, 162 g. (3 mols) butadiene, and 100 g. water, which mixture was kept under vigorous stirring and cooled between —15 and —20° C. After the addition of the peroxide, the mixture was kept for an additional half-hour at low temperature (between —15 and —20° C.). The excess butadiene was then distilled off and recovered. The reaction mass was extracted with petroleum ether. The chloroethers were distilled off from the ether extract, the 1–2 isomer (38%) distilling at 60° C. and 15 mm., and the 1–4 isomer (62%) at 80° C. and 15 mm. The yield of the two isomers was 30% based on the peroxide and quantitative based on the butadiene. The analysis of chlorine in the two fractions respectively gave the following results: 22.15% and 22.05%. The chlorine calculated for the t-butoxy-chloro-butene was 21.83%.

Example 2

Proceeding as in Example 1, but using cuprous chloride in lieu of ferrous sulphate and using the following mol quantities: t-butyl-hydroperoxide 1 mol, cuprous chloride 0.6 mol, hydrochloric acid 1 mol, and butadiene 3 mols, followed by extraction and successive distillation of the chloroether isomers, similar yields as in the preceding example were obtained.

Example 3

90 g. t-butyl-hydroperoxide and 91 g. ferrous sulphate (aqueous saturated solution) were added at the same time and separately at the same rate to a mixture, kept at a temperature between —15 and —20° C., under stirring, and consisting of: 162 g. ferric chloride, 42 g. lithium chloride, 210 g. butadiene, 150 g. acetone, 100 g. water. The separation was carried out as in Example 1, 178 g. butadiene were recovered. Distilling the chloroethers gave: 36 g. of the 1–2 isomer at 55° C. and 5 mm., and 59 g. of the 1–4 isomer at 75–90° C. and 15 mm.

The analysis of chlorine in the two fractions was respectively: 22.15% and 22.05%; the chlorine calculated for the t-butoxy-chloro-butene was 21.83%.

Example 4

Proceeding as in Example 3, but using sodium chloride in lieu of lithium chloride, with the same molar ratios, similar results were obtained.

Example 5

76 g. cumene hydroperoxide and 45.5 g. ferrous sulphate (aqueous saturated solution) were added, at the same time and separately during a half-hour interval, to a mixture, stirred vigorously and kept at —15° C., consisting of: 81 g. ferric chloride, 31 g. sodium chloride, 80 g. butadiene, 100 g. acetone, 100 g. water.

After the addition was completed, the stirring was continued for an additional half-hour; the excess butadiene was distilled off, and recovered. The mass was extracted with petroleum ether; the chloroether isomer mixture was distilled between 60 and 100° C. under 1 mm. pressure. The mixture of chloroethers contained: 38% of the 1–2 isomer and 62% of the 1–4 isomer. The total yield of the two isomers was 39.4% based on the peroxide and quantitative based on the butadiene.

Obviously, many modifications and variations of the present invention are possible in the light of the above teachings. It is therefore to be understood that within the scope of the appended claims, the invention may be practiced otherwise than as specifically described.

We claim:

1. A process for the preparation of 1,4 and 1,2 chlorobutenyl ethers of the formula RO—$C_4H_6$—Cl wherein R is selected from the group consisting of alkyl, cycloalkyl and aralkyl of up to 9 carbon atoms, which comprises reacting 1,3 butadiene with a hydroperoxide of the formula RO—OH, where R has the above meaning, and a chlorine ion yielding substance selected from the group consisting of hydrochloric acid and water-soluble inorganic chlorides, in the presence of a catalyst selected from the group consisting of cuprous and ferrous salts and in an aqueous solution.

2. A process for the preparation of 1,4 and 1,2 chlorobutenyl ethers of the formula RO—$C_4H_6$—Cl wherein R is t.butyl, which comprises reacting 1,3 butadiene with t.butylhydroperoxide and a chlorine ion yielding substance selected from the group consisting of hydrochloric acid and water-soluble inorganic chlorides, in the presence of a catalyst selected from the group consisting of cuprous and ferrous salts and in an aqueous solution.

3. A process for the preparation of 1,4 and 1,2 chlorobutenyl ethers of the formula RO—$C_4H_6$—Cl wherein R is cumene, which comprises reacting 1,3 butadiene with cumenehydroperoxide and a chlorine ion yielding substance selected from the group consisting of hydrochloric acid and water-soluble inorganic chlorides, in the presence of a catalyst selected from the group consisting of cuprous and ferrous salts and in an aqueous solution.

4. A process for the preparation of 1,4 and 1,2 chlorobutenyl ethers of the formula RO—$C_4H_6$—Cl wherein R is t.butyl, which comprises reacting 1,3 butadiene with t.butylhydroperoxide and a chlorine ion yielding substance selected from the group consisting of hydrochloric acid and water-soluble inorganic chlorides, in the presence of a catalyst selected from the group consisting of cuprous and ferrous salts and in an aqueous solution, at a temperature between —20° C. and 0° C.

5. A process for the preparation of 1,4 and 1,2 chlorobutenyl ethers of the formula RO—$C_4H_6$—Cl wherein R is cumene, which comprises reacting 1,3 butadiene with cumenehydroperoxide and a chlorine ion yielding substance selected from the group consisting of hydrochloric acid and water-soluble inorganic chlorides, in the presence of a catalyst selected from the group consisting of cuprous and ferrous salts and in an aqueous solution, at a temperature between —20° C. and 0° C.

6. A process for the preparation of 1,4 and 1,2 chlorobutenyl ethers of the formula RO—$C_4H_6$—Cl wherein R is selected from the group consisting of alkyl, cycloalkyl and aralkyl of up to 9 carbon atoms, which comprises reacting 1,3 butadiene with a hydroperoxide of the formula RO—OH, where R has the above meaning, and a chlorine ion yielding substance selected from the group consisting of hydrochloric acid and water soluble inorganic chlorides, in the presence of a catalyst selected from the group consisting of cuprous and ferrous salts and in an aqueous solution, and separating the resulting 1–4 and 1-2 chlorobutenyl ether mixture by fractional distillation.

7. A process for the preparation of 1,4 and 1,2 chlorobutenyl ethers of the formula RO—$C_4H_6$—Cl, wherein R is t.butyl, which comprises reacting 1,3 butadiene with t.butylhydroperoxide and hydrochloric acid, in the presence of a catalyst selected from the group consisting of cuprous and ferrous salts and in an aqueous solution, at a temperature between —20° C. and 0° C.

8. A process for the preparation of 1,4 and 1,2 chlorobutenyl ethers of the formula RO—$C_4H_6$—Cl wherein R is t.butyl, which comprises reacting 1,3 butadiene with t.butylhydroperoxide and a water-soluble inorganic chloride, in the presence of a catalyst selected from the group consisting of cuprous and ferrous salts and in an aqueous solution, at a temperature between —20° C. and 0° C.

9. A process for the preparation of 1,4 and 1,2 chlorobutenyl ethers of the formula RO—$C_4H_6$—Cl wherein R is cumene, which comprises reacting 1,3 butadiene with cumenehydroperoxide and hydrochloric acid, in the presence of a catalyst selected from the group consisting of cuprous and ferrous salts and in an aqueous solution, at a temperature between —20° C. and 0° C.

10. A process for the preparation of 1,4 and 1,2 chlorobutenyl ethers of the formula RO—$C_4H_6$—Cl wherein R is cumene, which comprises reacting 1,3 butadiene with cumenehydroperoxide and a water-soluble inorganic chloride, in the presence of a catalyst selected from the group consisting of cuprous and ferrous salts and in an aqueous solution, at a temperature between —20° C. and 0° C.

References Cited by the Examiner

UNITED STATES PATENTS 2,462,830   3/1949   Cass.
2,938,918   5/1960   Lavigne _____ 260—539 X

OTHER REFERENCES

Tinyakova et al., English translation of article appearing in Zhur. Obshchei Khim., 29, No. 4 (1959), pages 1262–1269 (1961), 8 pages.

Shelton et al., Jour. of Org. Chem. (1961), pages 2185–2190.

Ziegenbein et al., German application 1,108,206,- printed June 8, 1961.

LEON ZITVER, *Primary Examiner.*

B. HELFIN, H. T. MARS, *Assistant Examiners.*